Nov. 17, 1942.       E. H. DICKENSON       2,302,010
DUSTLESS ROCK DRILL
Filed Nov. 19, 1941
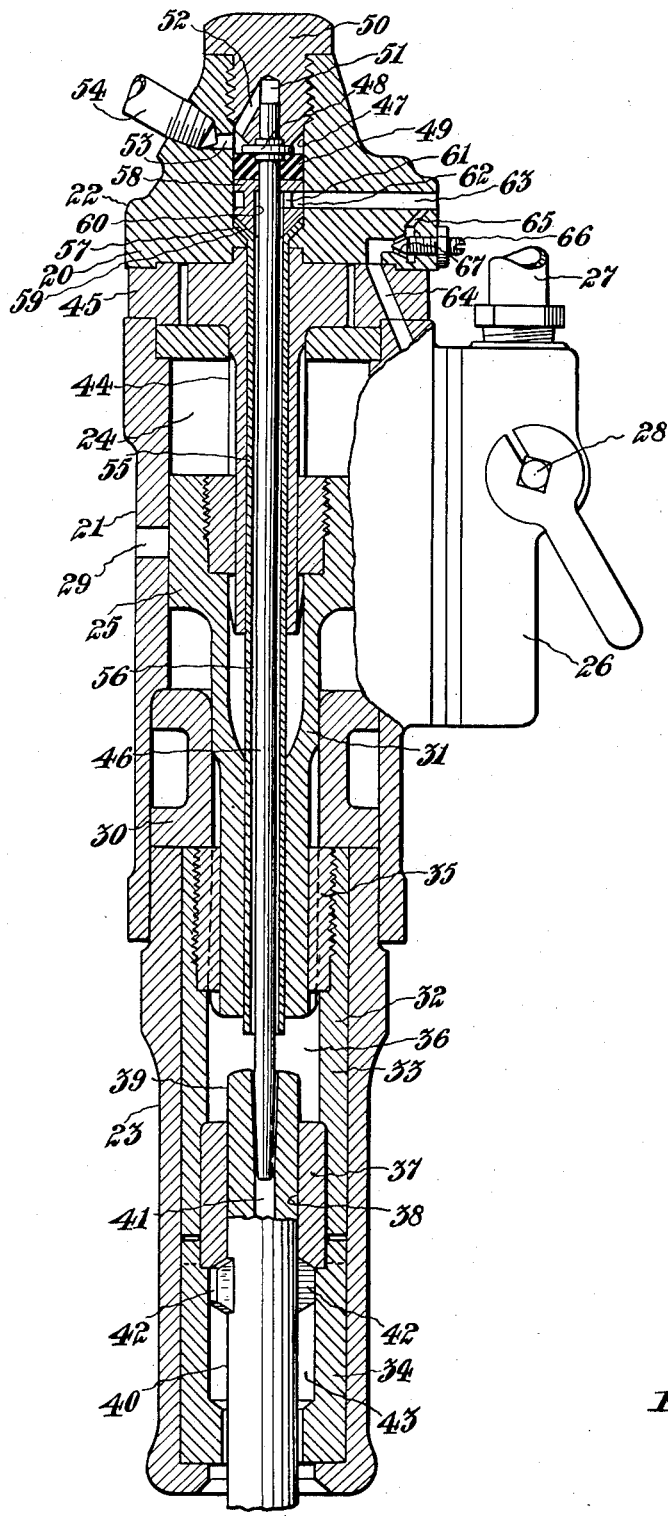
INVENTOR
Ernest H. Dickenson
BY
HIS ATTORNEY.

Patented Nov. 17, 1942

2,302,010

UNITED STATES PATENT OFFICE 2,302,010

DUSTLESS ROCK DRILL

Ernest H. Dickenson, New York, N. Y., assignor to Ingersoll Rand Company, New York, N. Y., a corporation of New Jersey Application November 19, 1941, Serial No. 419,670

3 Claims. (Cl. 121—10)

This invention relates to fluid actuated rock drills, and more particularly to rock drills of the hammer type equipped with means for flushing the cuttings from the hole being drilled.

One object of the invention is to prevent the entrance of pressure fluid into and the consequent conveyance of dust in a dry form from the drill hole to the atmosphere.

Other objects will be in part obvious and in part pointed out hereinafter.

The figure in the accompanying drawing is an elevation, partly in section, of a rock drill constructed in accordance with the practice of the invention.

Referring more particularly to the drawing, 20 designates a rock drill comprising, as casing parts, a cylinder 21, a back head 22 and a front head 23 both of which may be secured to the cylinder in any well known manner.

The cylinder 21 is bored to provide a piston chamber 24 for the accommodation of a reciprocatory hammer piston 25. The flow of pressure fluid to the ends of the piston chamber for actuating the piston is controlled by a suitable distributing valve mechanism only the valve chest 26 of which is shown, such pressure fluid being conveyed to the valve chest by a conduit 27 and communication between the conduit and the distributing valve mechanism is controlled by a throttle valve 28. The cylinder has a free exhaust port 29 for the escape of fluid from the piston chamber.

In the forward end of the cylinder 21 is a front cylinder washer 30 to form a closure for the piston chamber and an abutment for the rearward end of the front head 23 which extends into the cylinder 21. The front cylinder washer is bored to serve as a guide for a piston stem 31 extending forwardly of the piston into a chuck 32 rotatable in the front head 23.

The chuck is shown as consisting of two parts 33 and 34 that are clutched together, in a well known manner, and in the rearward chuck part 33 is a chuck nut 35 wherewith the piston stem 31 is slidably interlocked so that the piston and the chuck will rotate in unison. The chuck nut 35 is so located that during the reciprocations of the piston the front end of the stem 31 moves forwardly of the chuck nut and into a cavity 36 defined by the chuck part 33, the front end of the chuck nut 35 and the rearward end of a chuck bushing 37 shown extending into the adjoining portions of the chuck parts 33 and 34.

The chuck bushing may be press fitted into the chuck part 33 and has a bore 38 to receive the shank 39 of a drill steel 40 the rearward end of which extends into the cavity 36 to receive the blows of the hammer piston. The drill steel 40 is of the hollow type, having a passage 41 for conveying cleansing liquid into the hole being drilled, and on the periphery of the drill steel are wings 42 to slidably interlock with a rib or ribs 43 in the chuck part 34 to prevent relative rotation between the drill steel and the chuck.

Rotative movement of the piston and the train of elements connecting it with the drill steel is effected in a well known manner by a rifle bar 44, wherewith the piston is slidably interlocked, and a ratchet ring 45 clamped between the cylinder and the back head to form an abutment for the rifle bar.

The cleansing fluid, as for example water serving to flush the cuttings from the hole being drilled, is conveyed into the drill steel by a tube 46 that extends axially through the rifle bar 44, the piston 25 and the cavity 36 and with its front end into the passage 41 in the drill steel. The rearward end of the tube 46 lies within a recess 47 in the back head 22 and has an external collar 48 near its rearward end that seats upon a gasket 49 in the recess 47 and is held thereagainst by a plug 50 threaded into the recess 47 for sealing the outer end of the recess.

The plug 50 has an aperture 51 to receive the rear end of the tube 46 and also has a passage 52 to communicate the aperture 51 with the recess 47 at a point immediately rearwardly of the gasket 49. A port 53 affords communication between the recess 47 and a water supply conduit 54 threadedly connected to the back head 22.

In rock drills of the fluid actuated type considerable difficulty is experienced through the leakage of pressure fluid into the chuck cavity 36, whence it passes through the drill steel into the drill hole in the form of bubbles that carry injurious dust to the surface and discharge it into the atmosphere.

Various means have been heretofore employed for preventing an occurrence of this nature as, for example, by venting the chuck cavity 36 directly to the atmosphere through apertures in the chuck and the front head. This expedient is, however, unsatisfactory for the reason that the vents lie closely adjacent the source of dust and dust will be drawn into the chuck cavity by the pumping action of the piston 25 and cause serious damage to the rock drill parts. It has, moreover, been found that, owing to the injector action of the water flowing from the tube 46 into the passage 41 in the drill steel, air is drawn from the chuck cavity into the drill steel and carries dust from the drill hole to the atmosphere.

In order, therefore, to avoid the occurrence of the aforesaid undesirable conditions the rock drill is provided with a tube 55 that encircles the tube 46 and extends through the rifle bar 44 and the piston 25 and communicates with its front end with the cavity 36. The tube 55 is arranged coaxially with the tube 46 and its internal diameter is sufficiently larger than the diameter of the tube 46 to define an annular passage 56 of ample flow area between the tubes for the escape of any pressure fluid that may leak into the chuck cavity 36.

The rearward end of the tube 55 lies within the front end of the recess 47. It is preferably in the form of a funnel-shaped flange 57 that seats upon the bottom of the recess and is held thereagainst by a plug 58 arranged beneath the gasket 49 and having a tapered surface 59 that seats upon the flange 57.

The plug 58 is provided with a recess 60 that extends part way through said plug and forms a continuation of the annular passage 56. At the rearward end of the recess 60 is a radial passage 61 that opens into an annular groove 62 in the periphery of the plug, and in the back head 22 is a passage 63 to afford communication between the port 62 and the atmosphere.

From the foregoing description it will be readily apparent to those skilled in the art that the chuck cavity 36 is in constant communication with the atmosphere so that any pressure fluid leaking from the piston chamber into the chuck cavity may readily escape through the tube 55 and the associated passages instead of passing through the drill steel 40 into the drill hole. It will, moreover, be apparent that the point at which such pressure fluid reaches the atmosphere is located a sufficient distance from the source of dust to obviate the chances of dust being drawn into the chuck cavity by the action of the piston.

In order, however, to further avoid the possibility of dust finding its way into the rock drill or the injection of air into the stream of water flowing into the drill steel means are provided to maintain a sub-atmospheric pressure in the cavity 36 as by extending a passage 64 from a source of pressure fluid supply, the distributing valve mechanism 26 in the present instance, to a point in the passage 63 near the mouth thereof. The outlet portion 65 of the passage 64 is inclined in such wise with respect to the passage 63 that pressure fluid issuing from the passage 64 will flow substantially directly through the outer end of the passage 63 to the atmosphere. A needle valve 66 is threaded into the back head 22 to cooperate with a tapered surface 67 in the passage 64 for controlling the flow of pressure fluid through the said passage 64.

I claim:

1. In a fluid actuated rock drill, a casing having a cavity, a hollow working implement extending into the cavity, a conduit in the casing communicating with its front end with the cavity to provide an outlet for pressure fluid leaking into the cavity, a passage in the casing to communicate the rearward end of the conduit with the atmosphere, and a passage for introducing a jet of pressure fluid into the first mentioned passage to maintain a sub-atmospheric pressure in the cavity.

2. In a fluid actuated rock drill, a casing, a chuck in the casing having a cavity, a hollow working implement extending into the cavity, a hammer piston reciprocable in the casing to actuate the working implement, a conduit in the hammer piston communicating with the cavity to provide an outlet for pressure fluid leaking into the cavity, a passage in the casing to communicate the conduit with the atmosphere, and a passage for introducing a jet of pressure fluid into the first mentioned passage to maintain a sub-atmospheric pressure in the cavity.

3. In a fluid actuated rock drill, a casing having a cavity, a hollow working implement extending into the cavity, a conduit in the casing communicating with its front end with the cavity to provide an outlet for pressure fluid leaking into the cavity, a passage in the casing to communicate the rearward end of the conduit with the atmosphere, a passage for introducing a jet of pressure fluid into the first said passage to maintain a sub-atmospheric pressure in the cavity, and a valve to control the last-mentioned passage.

ERNEST H. DICKENSON.